J. C. LEWIS.
RIM FOR VEHICLE WHEELS.
APPLICATION FILED JAN. 2, 1920.
1,362,494. Patented Dec. 14, 1920.
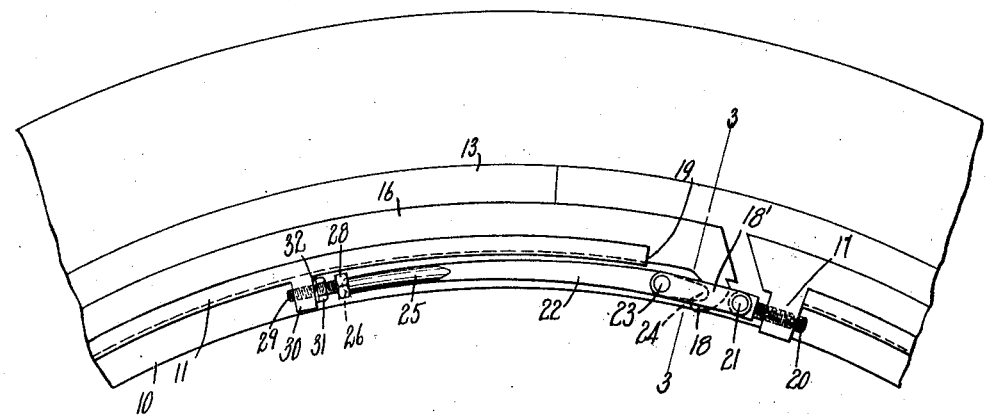
Fig. 1.
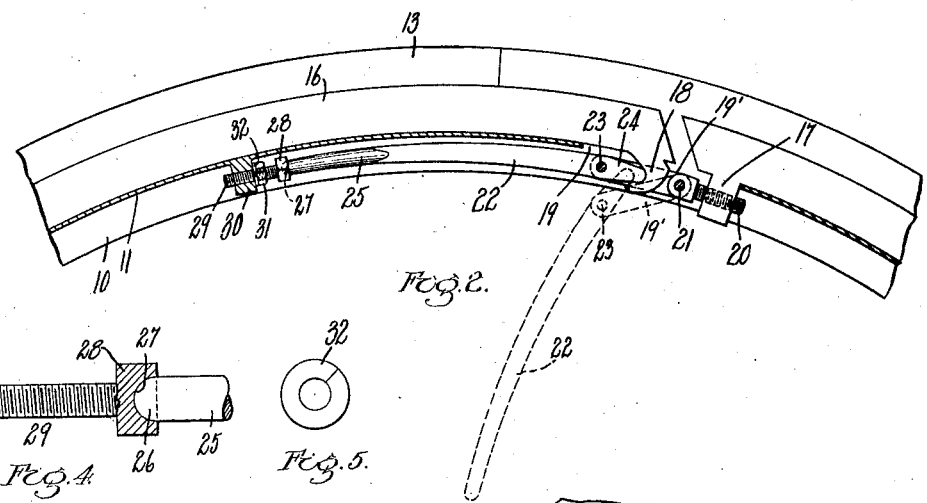
Fig. 2.
Fig. 4. Fig. 5.
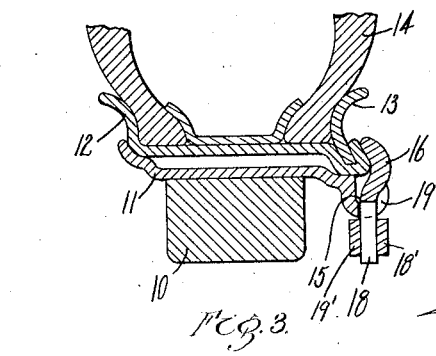
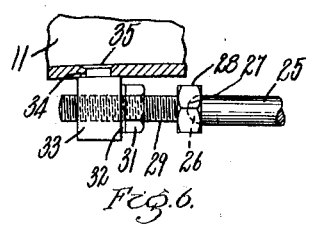
Fig. 6.
Fig. 3.
Inventor:
James C. Lewis,
by his attorney,
Charles T. Gooding.

UNITED STATES PATENT OFFICE.

JAMES C. LEWIS, OF BOSTON, MASSACHUSETTS, ASSIGNOR TO LEWIS RIM COMPANY, A CORPORATION OF MAINE.

RIM FOR VEHICLE-WHEELS.

1,362,494. Specification of Letters Patent. Patented Dec. 14, 1920.

Application filed January 2, 1920. Serial No. 348,761.

*To all whom it may concern:*

Be it known that I, JAMES C. LEWIS, a citizen of the United States, residing at Boston, in the county of Suffolk and State of Massachusetts, have invented new and useful Improvements in Rims for Vehicle-Wheels, of which the following is a specification.

This invention relates to rims for vehicle wheels and particularly to rims used in connection with pneumatic tires.

The object of the invention is to provide means for quickly locking and unlocking a demountable rim to and from a permanent rim on a vehicle wheel.

The invention relates particularly to the means whereby a split clamping ring is contracted and allowed to expand and to the improved means for locking said contracting means in position when the split ring is contracted.

The invention consists in the combination and arrangement of parts set forth in the following specification and particularly pointed out in the claims.

Referring to the drawings:

Figure 1 is a front elevation of a portion of a vehicle wheel rim and tire with my improved split ring contracting means attached thereto.

Fig. 2 is a sectional elevation illustrating the contracting means in full lines with the split ring contracted and illustrating said means in dotted lines, when the split ring is being released and allowed to expand.

Fig. 3 is an enlarged sectional elevation taken on line 3—3, Fig. 1.

Fig. 4 is a detail sectional elevation of the lever locking stud with a portion of the lever shown in connection therewith.

Fig. 5 is a front elevation of the split washer.

Fig. 6 is a sectional elevation illustrating a modified form of locking stud.

In the drawings, 10 is the felly of a wheel to which is fastened a permanent rim 11. Upon said permanent rim is mounted a demountable rim 12 which has attached thereto a split flange 13 whereby a pneumatic tire 14 may be positioned upon the demountable rim 12. The permanent rim 11 has an annular groove 15 extending therearound in which is located a split ring 16; said split ring has a lug 17 adjacent one end thereof and a hook-shaped lug 18 adjacent the other end thereof and both of said lugs project through a notch 19 in the rim 11.

A stud 20 has screw-threaded engagement with the lug 17 and two links 18' and 19' are pivoted at 21 to said stud at one end of said links. A lever 22 is pivoted at 23 to the other ends of said links; one end 24 of said lever is adapted to engage the hook-shaped lug 18; the other end of said lever is preferably made cylindrical at 25 and has a rounded end 26 which fits in a corresponding recess 27 in the head 28 of a screw-threaded stud 29; said stud 29 has screw-threaded engagement with a lug 30 integral with the rim 11; said stud 29 is adjustable circumferentially of the rim 11 and is locked in position by a lock nut 31 and a split washer 32.

In Fig. 6 a modified form of the lug 30 is illustrated, namely, a lug 33 which is shouldered at 34 and is riveted at 35 to the rim 11. The stud 29 in Fig. 6 is the same as in Figs. 2 and 4, and also the lever 22 and links 18' and 19'.

The general operation of the device hereinbefore described is as follows:

Referring to Figs. 1 to 5 inclusive, the demountable rim 12 with the tire 14 thereon is positioned upon the permanent rim 11 in a manner well-known to those skilled in the art. The split ring is then placed in the annular groove 15 with the lug 17 in the notch 19 and with one side of said lug bearing against the rim 11 at 36, Fig. 2. The lever 22 and the links 18 and 19 are then swung about the pivot 21 and the end 24 of the lever is caused to engage the hook-shaped lug 18. Said lever is then rocked about the pivot 23 by moving the same outwardly until the lever and the links assume the relative positions illustrated in full lines in Fig. 2. The stud 29 is then screwed toward the right in Fig. 2 until the recess 27 is engaged by the rounded end 26 of the lever 22. The lock nut 31 is then screwed in the opposite direction and together with the split washer 32 will lock the stud in position to lock the lever 22 in the position illustrated in Fig. 2, with the split ring 16 contracted and with said split ring holding the demountable rim against lateral movement. When it is desired to remove the tire and the demountable rim 12, it is accomplished by screwing the stud 29 toward the left Fig. 2 and pulling the lever 25 down into the position illustrated in dotted lines and beyond said position until the lug 18 is released whereupon the ring 16 will expand and may be easily removed from the groove 15 in the rim 11 by springing outwardly the end of the ring 16 which has the lug 18 thereon and then drawing the ring out of the groove 15 throughout the entire extent of said ring.

It will be seen that when the stud 29 is screwed in the proper direction to engage the lever 22 and lock the parts in the relative positions illustrated in Fig. 2, the ring 16 cannot move circumferentially of the rim 11 in either direction, for it is prevented from moving toward the right in said Fig. 2 by the lug 17 abutting against the rim 11 at 36 and it is prevented from moving toward the left in Fig. 2 by the lever 22 which at one end thereof engages the hook-shaped lug 18 and at the other end thereof engages the stud 29, thus the split ring is firmly locked in position.

It will also be seen that when the stud 20 is adjusted in the lug 17 in either direction for the purpose of placing the end 24 of the lever 22 in the right position to engage the lug 18 and contract the split ring 16 the proper amount to make it perfectly tight in the groove 15, the stud 29 can be adjusted also circumferentially of the rim to compensate for the different position assumed by the lever 22 when in locking position, caused by the adjustment of the stud 20.

I claim:

1. The combination with a rim of an expansible and contractible ring mounted on said rim, lugs on said ring adjacent the opposite ends thereof and means adjustably secured to one of said lugs adapted to engage the other of said lugs and draw said lugs toward each other whereby said ring will be contracted, and locking means mounted upon said rim and adapted to be adjusted circumferentially thereof to engage said first-named means and lock them in position when said ring is contracted.

2. The combination with a rim of an expansible and contractible ring mounted on said rim, a lever fulcrumed on said ring adapted to be rocked to contract the same and means mounted on said rim and adjustable circumferentially thereof adapted to engage said lever and lock it in position when said ring is contracted.

3. The combination with a rim of an expansible and contractible ring mounted thereon, a pair of lugs on said ring, a lever adjustably secured to one of said lugs and adapted to be moved to engage the other of said lugs to contract said ring, means to position said ring on said rim and a stop adjustable circumferentially on said rim and adapted to engage said lever and lock the same in position while said ring is contracted.

4. The combination with a permanent rim of a split ring mounted on said rim, a lug on said ring adjacent one end thereof, a hook-shaped lug on said ring adjacent the other end thereof, a link pivotally mounted at one end thereof upon said first named lug, a lever pivotally mounted upon the other end of said link, one end of said lever being adapted to engage said hook-shaped lug, whereby upon rocking said lever outwardly said ring may be contracted and means mounted on said rim adapted to be moved circumferentially on said rim to engage the opposite end of said lever and lock said lever in position while said ring is contracted.

5. The combination with a permanent rim of a split ring mounted on said rim, a lug on said ring adjacent one end thereof, a stud mounted upon said lug and adjustable circumferentially of said ring, a link pivoted at one end thereof to said stud, a lever pivoted to the other end of said link, a hook-shaped lug on the other end of said ring adapted to be engaged by one end of said lever and means mounted on said rim adjustable circumferentially upon said rim and adapted to abut against the other end of said lever and lock the same in position with said ring contracted.

6. The combination with a permanent rim of a split ring mounted on said rim, a lug on said ring adjacent one end thereof, a stud mounted upon said lug and adjustable circumferentially of said ring, a link pivoted at one end thereof to said stud, a lever pivoted to the other end of said link, a hook-shaped lug on the other end of said ring adapted to be engaged by one end of said lever and another stud mounted on said rim having screw-threaded engagement therewith and movable circumferentially of said rim adapted to abut against the other end of said lever and lock it in position with said ring in contracted position.

7. The combination with a permanent rim of a split ring mounted on said rim, a lug on said ring adjacent one end thereof, a stud mounted upon said lug and adjustable circumferentially of said ring, a link pivoted at one end thereof to said stud, a lever pivoted to the other end of said link, a hook-shaped lug on the other end of said ring adapted to be engaged by one end of said lever and another stud mounted on said rim having screw-threaded engagement therewith and movable circumferentially thereof, said last-named stud having a recess in one end thereof adapted to engage the other end of said lever and lock said lever in position with said ring in contracted position.

8. The combination with a permanent rim having an annular groove therein of a contractible and expansible ring mounted on said rim within said groove, a lug on one end of said ring projecting through a notch provided in said rim and adapted to bear against said rim at one end of said notch, a hook-shaped lug on the other end of said ring also adapted to project through said notch, a link pivotally connected to said first named lug at one end thereof, a lever pivotally connected to said link at the other end thereof, one end of said lever being adapted to engage said hook-shaped lug and means movable circumferentially upon said rim adapted to engage the other end of said lever and lock it in position when said ring is contracted.

In testimony whereof I have hereunto set my hand in presence of a subscribing witness.

JAMES C. LEWIS.

Witness:
FRANKLIN E. LOW.